United States Patent
Larchar, Sr. et al.

[11] 3,883,609
[45] May 13, 1975

[54] SYNERGISTIC VULCANIZATES OF POLY-CARBORANYLENESILOXANE POLYMERS

[75] Inventors: Trescott B. Larchar, Sr., Hamden; Robert N. Scott, Wallingford, both of Conn.

[73] Assignee: Olin Corporation, New Haven, Conn.

[22] Filed: Oct. 1, 1973

[21] Appl. No.: 402,443

[52] U.S. Cl............ 260/825; 260/2 M; 260/37 SB; 260/46.5 E; 260/46.5 G

[51] Int. Cl........................................... C08g 47/02
[58] Field of Search....................... 260/825, 46.5 E

[56] References Cited
UNITED STATES PATENTS

| | | | |
|---|---|---|---|
| 3,388,092 | 6/1968 | Heying et al. | 260/46.5 E |
| 3,463,801 | 8/1969 | Papetti et al. | 260/46.5 E |
| 3,637,589 | 1/1972 | Kwasnik et al. | 260/46.5 E |

*Primary Examiner*—Wilbert J. Briggs, Sr.
*Attorney, Agent, or Firm*—Thomas P. O'Day; Donald F. Clements; F. A. Iskander

[57] ABSTRACT

A synergistic vulcanizate is prepared by covulcanizing poly-carboranylenesiloxane polymers having recurring structural units of the following formulas:

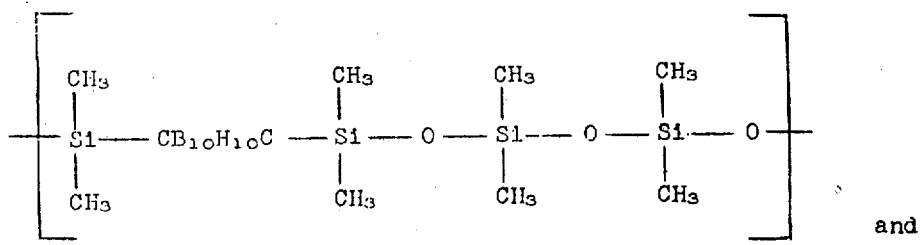

and

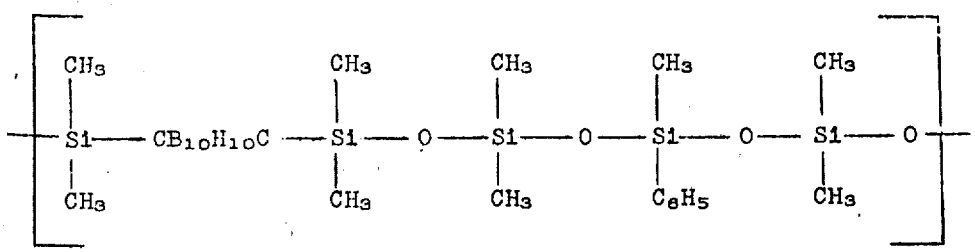

7 Claims, No Drawings

SYNERGISTIC VULCANIZATES OF POLY-CARBORANYLENESILOXANE POLYMERS

The invention herein described was made in the course of or under a contract or subcontract thereunder, with the Department of the Navy.

This invention relates to synergistic vulcanizates of selected poly-carboranylenesiloxane polymers. More particularly, the vulcanizates of this invention are prepared by covulcanizing poly-carboranylenesiloxane polymers having recurring units of the following structural formulas:

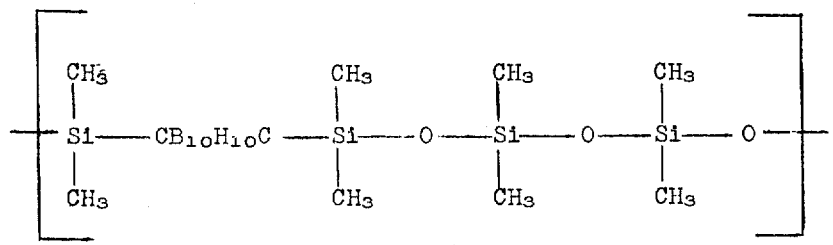

(A)

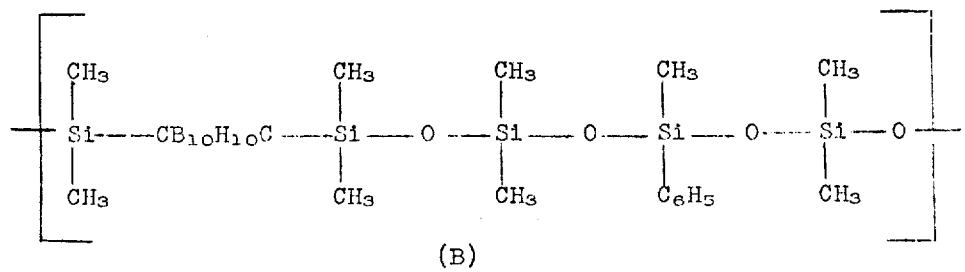

(B)

Henceforth in this application the above-noted formulas will be referred to by the shorthand symbols A and B as shown above. The chemical name for polymer A is poly [1-dimethylsilyl,7-(hexamethyltrisiloxanyl)-1,7-dicarbaclosododecaborane] and for polymer B is poly [1-dimethylsilyl,7-(5-phenyl-1,1,3,3,5,7,7-heptamethyltetrasiloxanyl)-1,7-dicarbaclosododecaborane].

Previous attempts to prepare vulcanizates of polymers A or B individually have generally proven unsuccessful. The polymer A was vulcanized using standard techniques, however, tackiness and occasional bubbling were noted in the resulting vulcanizates. The polymer B could not be vulcanized using standard techniques.

Now it has been found in accordance with this invention that vulcanizates of selected mixtures of polymers A and B resulted in surprising and synergistic improvement in the properties of the prepared product. The vulcanizates of this invention had higher ultimate tensile strength and percent elongation and also had improved resistance to both air oxidation and reversion in vacuum. While it is further noted that extrusion techniques could now be used on the prepared covulcanizates it was also noted that tackiness and bubbling in the resulting product were eliminated.

The surprising and advantageous properties shown by the vulcanizates of this invention are disclosed in the Examples. Examples V and VI show the problems associated with attempts to vulcanize either polymer A or B alone. The remaining Examples (I to IV) show the better properties exhibited when covulcanizing mixtures of polymers A and B, namely, higher tensile strength and elongation plus no problems with tackiness or bubbling.

The poly-carboranylenesiloxane polymers A and B as used in this invention can be prepared by high temperature, ferric chloride catalyzed, copolymerization of a bis(alkoxydialkylsilyl) carborane with a halogen containing silane, siloxane or silyl carborane as shown in U.S. Pat. Nos. 3,388,090 to '093. The polymers A and B may also be prepared by the controlled hydrolytic condensation of selected silicon containing carboranes as disclosed in U.S. Pat. No. 3,637,589. It is further noted that the radical —$CB_{10}H_{10}C$— as shown above in formulas A and B and throughout the remainder of this application is intended to mean the meta or the para carborane structure as shown for example in U.S. Pat. No. 3,397,221. This '221 patent additionally shows another method of preparing the polymers A and B.

The covulcanization procedure used in preparing the vulcanizates of this invention consists of mixing the components on a rubber mill followed by curing under pressure at elevated temperature using organic peroxide curing agents. Other variations of this standard procedure may also be used.

The recurring units of polymers A and B may have varying molecular weights. More particularly, polymer A may have a molecular weight of from about 16,000 to about 120,000 or higher and preferably from about 80,000 to about 120,000. Polymer B may have a molecular weight of from about 8,000 to about 20,000 or higher and preferably from about 12,000 to about 16,000. The phenyl group in polymer B may contain substituents such as alkyl, alkoxy and trifluoroalkyl of up to three carbon atoms if desired.

While the carborane structure may be meta or para as indicated above, the meta structure is preferred.

The proportions of polymer A and B used in preparing the covulcanizates of this invention may generally vary from about 1:20 to about 1:1.67 parts of polymer B to parts of polymer A by weight. Preferably, the amounts of polymers B and A used will vary from about 1:10 to about 1:2.5 and even more preferably about 1:5 parts of polymer B to parts of polymer A by weight will be used.

The vulcanizates of this invention may be used in a variety of high temperature applications such as extruded or molded rubber parts such as gaskets, O-rings and seals or as rubber slab-stocks.

This invention is further illustrated by the following examples.

EXAMPLE I

The following components were mixed in a rubber mill:

|  | Wt. (gms) | Parts by wt. |
|---|---|---|
| Polymer A | 5.0 | 100 |
| Polymer B | 0.5 | 10 |
| Min-U-Si (silica) | 4.0 | 80 |
| Cab-O-Sil Ms-7 (colloidal pyrogenic silica pigment) | 0.75 | 15 |
| $Fe_2O_3$ | 0.5 | 10 |
| Varox (organic peroxide) | 0.125 | 2.5 |

The molecular weight of polymer A used was about 94,000 and of polymer B was about 12,000. The carborane structure used was the meta carborane.

The mixture was then cured under pressure in a 2 × 2 × ⅛ inch mold for 45 to 48 minutes at 345°F. The tensile strength, elongation and hardness properties of the product were determined and then it was postcured at 500°F. for 72 hours in air. One portion of the product was further heated at 500°F. for 72 hours under vacuum. Property tests were again made and the results are as follows:

| Tensile Strength (psi) | |
|---|---|
| Initial | 370 |
| Postcured in Air | 400 |
| Vacuum heated | reverts (depolymerizes) |
| Elongation (%) | |
| Initial | 610 |
| Postcured in Air | 350 |
| Vacuum heated | reverts |
| Hardness (Shore A) | |
| Initial | 40 |
| Postcured in Air | 49 |

It was further observed that the prepared vulcanizate showed no signs of tackiness or bubbling.

EXAMPLE II

A vulcanizate was prepared using the same procedure followed in Example I except that 1.0 gms (20 parts by weight) of polymer B was used. Results were as follows:

| Tensile Strength (psi) | |
|---|---|
| Initial | 450 |
| Postcured in Air | 470 |
| Vacuum heated | reverts |
| Elongation (%) | |
| Initial | 810 |
| Postcured in Air | 455 |
| Vacuum heated | reverts |
| Hardness (Shore A) | |
| Initial | 45 |
| Postcured | 60 |

It was further observed that the prepared vulcanizate showed no signs of tackiness or bubbling.

EXAMPLE III

A vulcanizate was prepared using the same procedure followed in Example I except that 1.53 gms (30 parts by weight) of polymer B was used. Results were as follows:

| Tensile Strength (psi) | |
|---|---|
| Initial | 390 |
| Postcured in Air | 415 |
| Vacuum heated | 77 |
| Elongation (%) | |
| Initial | 655 |
| Postcured in Air | 385 |
| Vacuum heated | 300 |
| Hardness (Shore A) | |
| Initial | 44 |
| Postcured in Air | 58 |

It was further observed that the prepared vulcanizate showed no signs of tackiness or bubbling.

EXAMPLE IV

A vulcanizate was prepared using the same procedure followed in Example I except that 2.01 gms (40 parts by weight) of polymer B was used. Results were as follows:

| Tensile Strength (psi) | |
|---|---|
| Initial | 335 |
| Postcured in Air | 360 |
| Vacuum heated | 80 |
| Elongation (%) | |
| Initial | 580 |
| Postcured in Air | 315 |
| Vacuum heated | 35 |
| Hardness (Shore A) | |
| Initial | 42 |
| Postcured in Air | 56 |

EXAMPLE V

An attempt to prepare a vulcanizate was made using the procedure followed in Example I but with no polymer B present. Results were as follows:

| Tensile Strength (psi) | |
|---|---|
| Initial | 225 |
| Postcured in Air | 210 |
| Vacuum heated | reverts |
| Elongation (%) | |
| Initial | 585 |
| Postcured in Air | 280 |
| Vacuum heated | reverts |
| Hardness (Shore A) | |
| Initial | .40 |
| Postcured in Air | 49 |

It was further observed that the prepared vulcanizate was tacky and bubbles were present.

EXAMPLE VI

An attempt to prepare a vulcanizate was made using the procedure followed in Example I except that 5 gms (100 parts) of polymer B and no polymer A was used. The product although dimensionally stable was too soft to permit measurement of physical properties.

What is claimed is:

1. A vulcanizate of a mixture of polycarboranylenesiloxane polymers A and B said polymers having recurring structural units of the formulas:

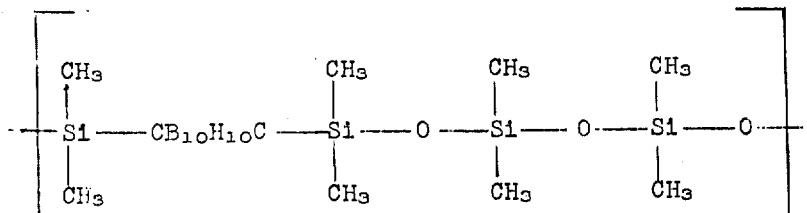

(A)

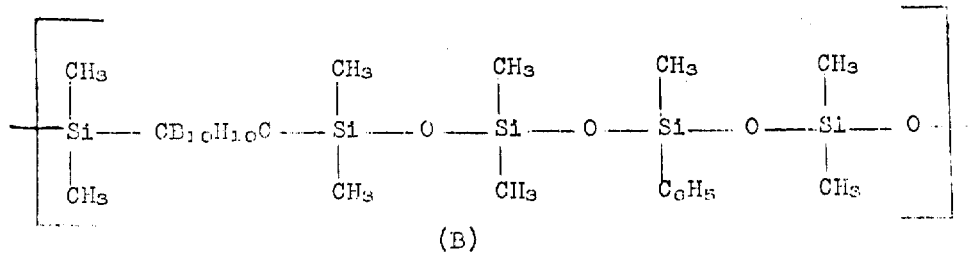

(B)

wherein from about 1:20 to about 1:1.67 parts of polymer B to parts of polymer A by weight are used.

2. The vulcanizate of claim 1 wherein about 1:10 to about 1:2.5 parts of polymer B to parts of polymer A by weight are used.

3. The vulcanizate of claim 1 wherein about 1:5 parts of polymer B to parts of polymer A by weight are used.

4. The vulcanizate of claim 1 wherein the molecular weight of polymer A is from about 16,000 to about 120,000 and the molecular weight of polymer B is from about 8,000 to about 20,000.

5. The vulcanizate of claim 4 wherein said carborane structure $-CB_{10}H_{10}C-$ in polymers A and B is the meta structure.

6. The vulcanizate of claim 5 wherein about 1:10 to about 1:2.5 parts of polymer B to parts of polymer A by weight are used.

7. The vulcanizate of claim 6 wherein about 1:5 parts of polymer B to parts of polymer A by weight are used.

* * * * *